US012759634B2

(12) United States Patent
Nagae

(10) Patent No.: US 12,759,634 B2
(45) Date of Patent: Oct. 13, 2026

(54) DRIVING SUPPORT APPARATUS, DRIVER SUPPORT METHOD AND NON-TRANSITORY COMPUTER-READABLE STORAGE MEDIUM

(71) Applicant: TOYOTA JIDOSHA KABUSHIKI KAISHA, Toyota (JP)

(72) Inventor: Hajime Nagae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/795,729

(22) Filed: Aug. 6, 2024

(65) Prior Publication Data

US 2025/0108863 A1 Apr. 3, 2025

(30) Foreign Application Priority Data

Oct. 3, 2023 (JP) ................................ 2023-172046

(51) Int. Cl.
*B62D 15/02* (2006.01)

(52) U.S. Cl.
CPC ......... *B62D 15/029* (2013.01); *B62D 15/025* (2013.01)

(58) Field of Classification Search
CPC . B62D 15/025; B62D 15/0255; B62D 15/029
See application file for complete search history.

(56) References Cited

U.S. PATENT DOCUMENTS

| | | | | |
|---|---|---|---|---|
| 7,692,534 | B2 | 4/2010 | Kataoka et al. | |
| 8,352,124 | B2 | 1/2013 | Taguchi | |
| 8,682,500 | B2 | 3/2014 | Sakugawa | |
| 8,818,634 | B2 | 8/2014 | Fujita et al. | |
| 9,168,953 | B2 | 10/2015 | Mitsumoto et al. | |
| 9,714,034 | B2 | 7/2017 | Otake et al. | |
| 9,880,558 | B2 | 1/2018 | Nakamura | |
| 9,902,399 | B2 | 2/2018 | Torii et al. | |
| 10,345,443 | B2 | 7/2019 | Masui et al. | |
| 10,589,786 | B2 * | 3/2020 | Fujii | B60W 30/09 |
| 10,611,240 | B2 | 4/2020 | Masui et al. | |
| 11,433,898 | B2 * | 9/2022 | Sato | B60W 50/14 |
| 11,498,617 | B2 * | 11/2022 | Akamatsu | B60W 30/12 |
| 11,565,700 | B2 * | 1/2023 | Oguro | B60W 30/18163 |
| 2012/0123643 | A1 * | 5/2012 | Limpibuntering | B62D 1/286 701/42 |

(Continued)

FOREIGN PATENT DOCUMENTS

| | | | | |
|---|---|---|---|---|
| JP | 2003-081115 A | | 3/2003 | |
| JP | 2025062789 A | * | 4/2025 | B62D 15/0255 |

*Primary Examiner* — Carl C Staubach
(74) *Attorney, Agent, or Firm* — Sughrue Mion, PLLC

(57) ABSTRACT

A driving support apparatus is configured to execute, as a deviation control, at least one of a deviation waring for informing a driver of a host vehicle that the host vehicle deviates from a travel area and a vehicle control for controlling a travel state of the host vehicle so that the host vehicle does not deviate from the travel area. The driving support apparatus is configured to suspend or terminate the deviation control when an override condition is satisfied while the deviation control is being executed, and make the override condition more difficult to be satisfied when there is a rear approaching vehicle in the travel area than when there is no rear approaching vehicle in the travel area.

20 Claims, 5 Drawing Sheets

(56) References Cited

U.S. PATENT DOCUMENTS

| | | | | |
|---|---|---|---|---|
| 2015/0336607 | A1* | 11/2015 | Inoue | B60W 30/10<br>701/41 |
| 2019/0047621 | A1* | 2/2019 | Kim | B62D 15/025 |
| 2020/0391793 | A1* | 12/2020 | Loussaut | G01L 5/221 |
| 2023/0059106 | A1* | 2/2023 | Takahashi | B62D 6/00 |
| 2023/0356741 | A1* | 11/2023 | Hayakawa | B60W 30/18163 |
| 2025/0196856 | A1* | 6/2025 | Nagae | B60Q 9/008 |

* cited by examiner

DRIVING SUPPORT APPARATUS, DRIVER SUPPORT METHOD AND NON-TRANSITORY COMPUTER-READABLE STORAGE MEDIUM

TECHNICAL FIELD

The present disclosure relates to a driving support apparatus that executes at least one of a deviation warning for informing a driver of a deviation from a travel area and a vehicle control for controlling a driving state of a host vehicle to prevent the host vehicle from deviating from the travel area as a deviation control, a driving support method in which a computer installed in the host vehicle executes the deviation control, and a program that causes the computer installed in the host vehicle to execute the deviation control.

BACKGROUND

Conventionally, there has been known a driving support apparatus that executes a deviation control when there is a possibility that the host vehicle may deviate from the travel area or when the host vehicle has deviated from the travel area.

For example, the driving support apparatus described in Patent Document 1 (hereinafter referred to as a "conventional apparatus") stops the above-mentioned deviation control when an override condition is satisfied. The override condition is satisfied when a driver performs a steering intervention.

Patent Document 1: Japanese Patent Application Laid-Open No. 2003-081115

SUMMARY

If there is a rear approaching vehicle approaching from the rear of the host vehicle in the travel area in which the host vehicle is traveling, the rear approaching vehicle may change lanes in order to overtake the host vehicle. If the driver of the host vehicle changes lanes without noticing the rear approaching vehicle, the host vehicle may deviate from the travel area, so the deviation control is executed. If the driver continues to steer the host vehicle to change lanes after the execution of the deviation control, the conventional apparatus is likely to determine that the driver performs the steering intervention and stop the deviation control. If the deviation control is stopped under such a situation, the host vehicle may collide with the rear approaching vehicle.

The present disclosure is made to address the above problem. That is, one of the objects of the present disclosure is to provide a driving support apparatus capable of reducing the possibility that the host vehicle collides with the rear approaching vehicle.

A driving support apparatus (10) according to the present disclosure (hereinafter, referred to as the "present disclosure apparatus") is configured to execute, as a deviation control, at least one of a deviation warning for informing a driver of a host vehicle (SV) that the host vehicle deviates from a travel area (TA) in which the host vehicle is traveling and a vehicle control for controlling a travel state of the host vehicle so that the host vehicle does not deviate from the travel area (step 340), when there is a possibility that the host vehicle may deviate from the travel area or when the host vehicle deviates from the travel area ("Yes" at step 310).

The present disclosure apparatus is configured to:

suspend or terminate the deviation control (step 350) when an override condition is satisfied while the deviation control is being executed ("Yes" at step 335), the override condition being a condition that is satisfied when a steering index value related to a steering operation performed by the driver is equal or greater than a threshold; and make the override condition more difficult to be satisfied (step 415) when there is a rear approaching vehicle (RV) in the travel area ("Yes" at step 405) than when there is no rear approaching vehicle in the travel area ("No" at step 405), the rear approaching vehicle being a vehicle approaching the host vehicle from a rear of the host vehicle.

According to the present disclosure apparatus, when there is the rear approaching vehicle, the override condition is made more difficult to be satisfied than when there is no rear approaching vehicle. The rear approaching vehicle approaching is likely to change lanes in order to overtake the host vehicle. According to the present disclosure apparatus, if the driver of the host vehicle changes lanes without noticing the lane change of the rear approaching vehicle, a possibility that the deviation control is suspended can be reduced. Thus, the possibility that the host vehicle collides with the rear approaching vehicle can be reduced.

DETAILED DESCRIPTION

Figure 1:
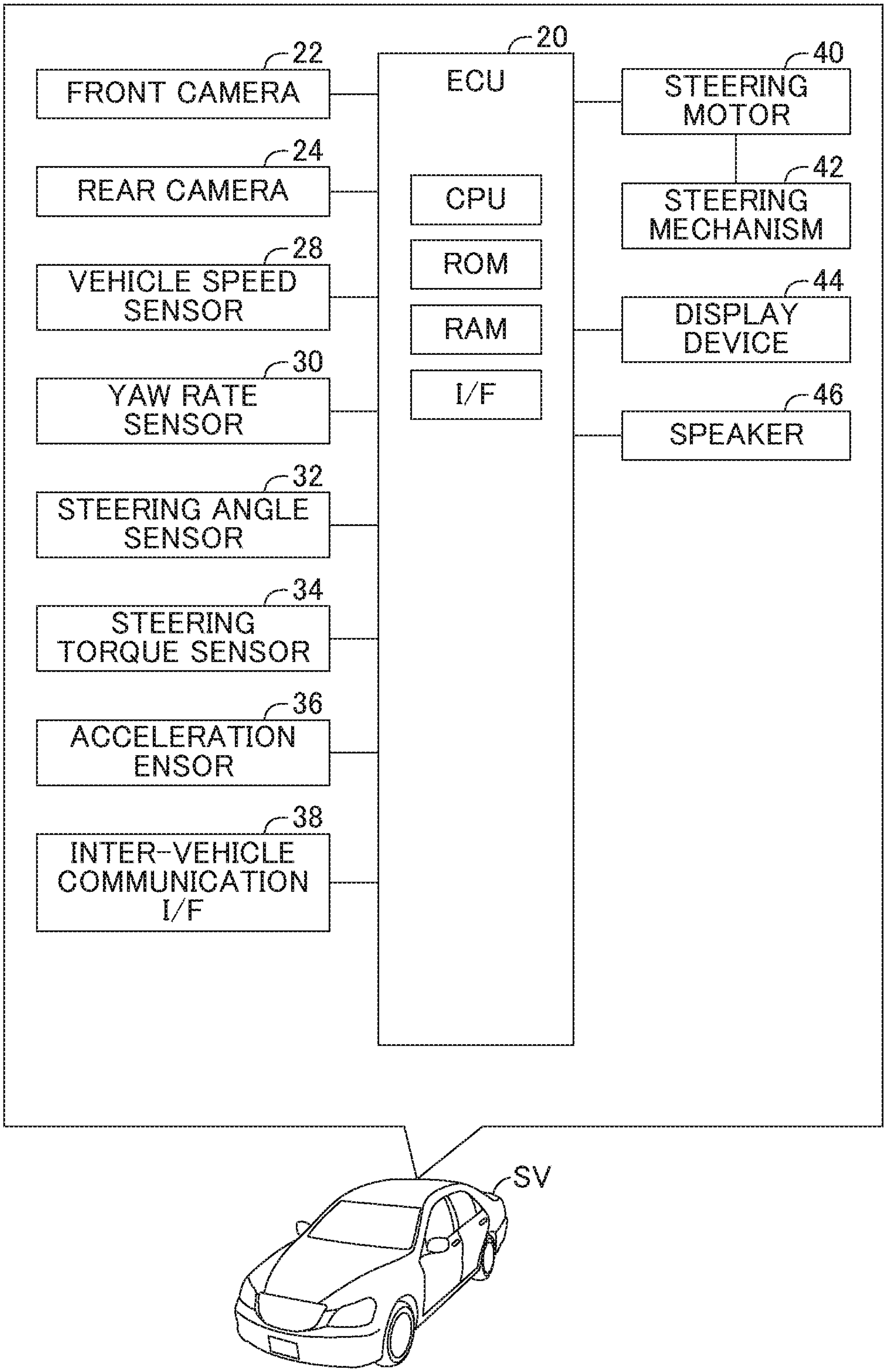
FIG. 1 is a schematic system configuration diagram of a driving support apparatus according to an embodiment of the present disclosure.

As shown in FIG. 1, a driving support apparatus 10 (hereinafter referred to as "the present apparatus 10") is applied to a host vehicle SV. The present apparatus 10 comprises components shown in FIG. 1.

In this specification, an "ECU 20" is an electronic control unit with a microcomputer as a main part. The ECU 20 is also referred to as a control unit, a controller and a computer. The microcomputer includes a CPU (processor), a ROM, a RAM, and an interfaces (I/F), etc. Functions realized by the ECU 20 may be realized by multiple ECUs.

A front camera 22 acquires front image data by capturing scenery in front of the host vehicle SV. A rear camera 24 acquires rear image data by capturing scenery behind the host vehicle SV. The ECU 20 acquires the front image data and the rear image data from the front camera 22 and the rear camera 24, respectively.

A vehicle speed sensor 28 detects a vehicle speed Vs, which represents a speed of the host vehicle SV. A yaw rate sensor 30 detects a yaw rate Yr of the host vehicle SV. A steering angle sensor 30 detects a steering angle $\theta$ of a steering wheel SW (referring to FIG. 2). If the steering wheel SW is steered to the right of a neutral position of the steering wheel SW, the steering angle θ is a negative value, and if the steering wheel SW is steered to the left of the neutral position, the steering angle θ is a positive value. A steering torque sensor 32 detects a steering torque Tr of the steering wheel SW. An acceleration sensor 34 detects an acceleration of the host vehicle SV in a front-rear axis direction Gx and an acceleration of the host vehicle SV in a vehicle width direction Gy. The ECU 20 acquires the detected values of these sensors.

An inter-vehicle communication interface (I/F) 38 is an interface for inter-vehicle communication between the host vehicle SV and another vehicle.

A steering motor 40 is incorporated in a steering mechanism 42. The steering mechanism 42 is a mechanism for steering steered wheels in response to the operation of the steering wheel SW. The steering motor 40 generates an assist torque in the steering mechanism 42 to assist the operation of the steering wheel SW and an automatic steering torque in the steering mechanism 42 to change a steered angle of the steered wheels in response to instructions from the ECU 20.

A display device 44 displays a deviation warning screen described below. Speaker 46 outputs a deviation warning sound described below.

<Deviation Control>

A deviation control is explained below with reference to FIG. 2.

The ECU 20 recognizes a right boundary RBL and a left boundary LBL of a travel area TA in which the host vehicle SV is traveling based on the front image data. When the right boundary RBL and the left boundary LBL do not need to be distinguished, each of these is referred to as a "boundary BL". For example, the boundary BL is a white line on a road, a guardrail, a curb, a wall or the like. The ECU 20 sets a right reference line RRL at a position that is separated from the right boundary RBL by a predetermined reference distance Dref inside the travel area TA in a direction orthogonal to the right boundary RBL. The ECU 20 sets a left reference line LRL at a position that is separated from the left boundary LBL by the predetermined reference distance Dref inside the travel area TA in the direction orthogonal to the left boundary LBL. When the right reference line RRL and the left reference line LRL do not need to be distinguished, each of these is referred to as a "reference line RL".

When one of the following conditions E1 and E2 is satisfied, the ECU 20 determines that an execution condition is satisfied and executes the deviation control.

Condition E1: A path distance Dpr along a predicted path PR from the host vehicle SV to a point at which the predicted path PR intersects the reference line RL is equal to or shorter than a predetermined threshold distance Dth. If this condition E1 is satisfied, the ECU 20 determines that the host vehicle SV may deviate from the travel area TA.

Condition E2: Part or all of a body of the host vehicle SV has deviated from the reference line RL.

As an example, the ECU 20 acquires the predicted path PR based on the vehicle speed Vs and the yaw rate Yr.

In the present embodiment, the ECU 20 executes, as the deviation control, a vehicle control that controls a driving state (the steered angle of the steered wheels) of the host vehicle SV so that the host vehicle SV does not deviate from the travel area TA.

In detail, the ECU 20 acquires a deviation suppression steering angle θdev for preventing the vehicle SV from deviating from the reference line RL (i.e., for returning the vehicle SV inside the reference line RL). The ECU 20 controls the steering motor 40 so that the steering angle θ matches the deviation suppression steering angle θdev.

The ECU 20 stops (suspends) the deviation control when an override condition is satisfied. As an example, the override condition is satisfied when a magnitude of the steering angle θ (|θ|) is equal to or greater than a threshold angle θth.

Summary of Operation

The ECU 20 makes the override condition more difficult to be satisfied when there is a rear approaching vehicle RV than when there is no rear approaching vehicle RV. The rear approaching vehicle RV is a vehicle that travels behind the host vehicle SV in the same travel area TA as the host vehicle SV and approaches the host vehicle SV.

As an example, the ECU 20 sets the threshold angle θth to a first threshold angle θ1th when there is no rear approaching vehicle RV, and sets the threshold angle θth to "a second threshold angle θ2th that is greater than the first threshold angle θ1th" when there is the rear approaching vehicle RV.

Figure 2:
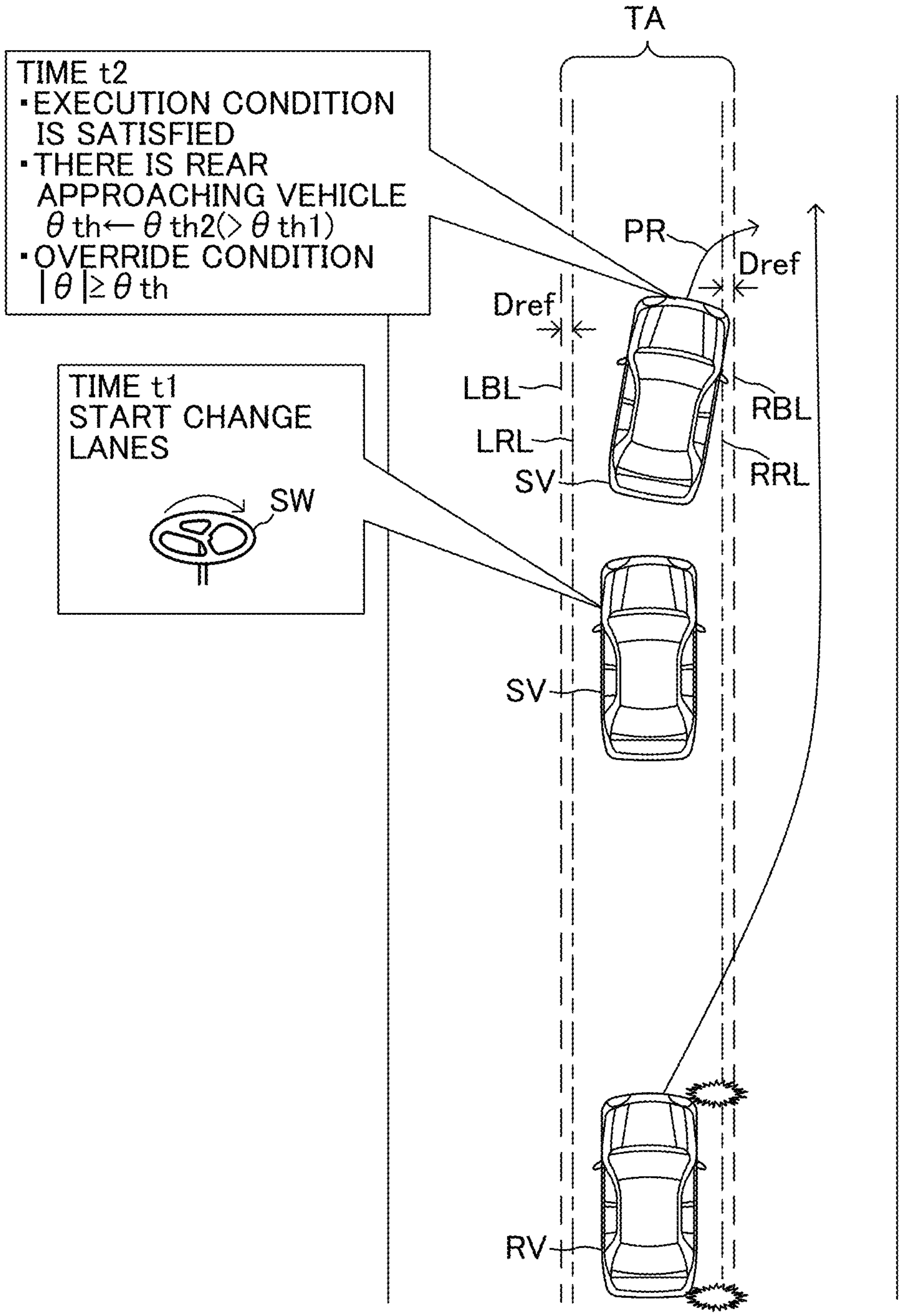
FIG. 2 is a drawing for describing an example of an operation of the driving support apparatus according to the embodiment of the present disclosure.

The rear approaching vehicle RV is likely to change lanes in order to overtake the host vehicle SV (referring to an arrow shown in FIG. 2). When the host vehicle SV changes lanes in such a situation, the execution condition will eventually be satisfied and the deviation control will be executed. If a driver continues to perform the steering operation to change lanes after the execution of the deviation control, the magnitude of the steering angle θ is likely to become equal to or larger than the threshold angle θth so that the override condition is likely to be satisfied.

According to the present embodiment, the override condition is less likely to be satisfied when there is the rear approaching vehicle RV than when there is no rear approaching vehicle RV. Even if the driver continues to perform the steering operation to change lanes after the execution of the deviation control, the override condition is difficult to be satisfied. As a result, a possibility that the deviation control continues to be executed increases so that a possibility of a collision that the host vehicle SV collides with the rear approaching vehicle RV can be reduced.

Example of Operation

At a time t1 shown in FIG. 2, the driver of the host vehicle SV starts a steering operation on the steering wheel SW to the right, and the host vehicle SV starts changing lanes to a lane on the right side of the travel area TA. At the time t1, the execution condition has not yet been satisfied, so the deviation control is not executed.

At a time t2, the execution condition is satisfied and the ECU 20 starts the deviation control. There is the rear approaching vehicle RV. Therefore, the ECU 20 makes the override condition difficult to be satisfied by setting the threshold angle θth to the second threshold angle θth2.

(Specific Actuation)

<Deviation Control Routine>

Figure 3:
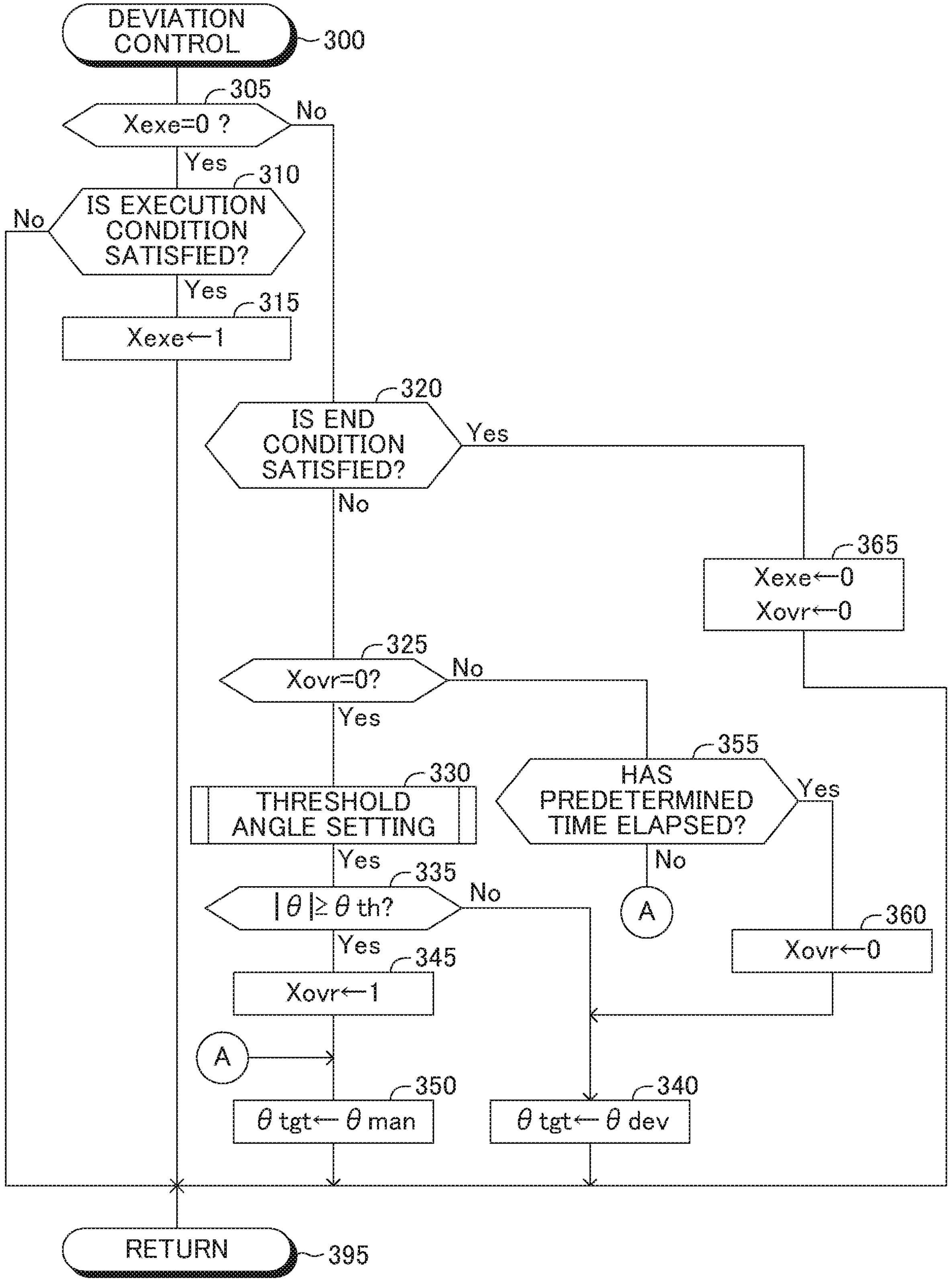
FIG. 3 is a flowchart illustrating a deviation control routine executed by a CPU of an ECU shown in FIG. 1.

A CPU of the ECU 20 executes a routine shown by a flowchart in FIG. 3 every time a predetermined time elapses.

When an appropriate time point comes, the CPU starts a process from step 300 in FIG. 3. At step 305, the CPU determines whether or not a value of an execution flag Xexe is "0". The value of the execution flag Xexe is set to "1" when the execution condition is satisfied, and is set to "0" when an end condition is satisfied. The value of the execution flag Xexe is set to "0" in an initial routine. The initial routine is executed by the CPU when an ignition key switch (not shown) of the host vehicle SV is changed from an off position to an on position.

If the value of the execution flag Xexe is "0", the CPU makes a "Yes" determination at step 305 and the process proceeds to step 310. At step 310, the CPU determines whether or not the execution condition is satisfied by determining whether or not one of the above conditions E1 and E2 is satisfied.

If the execution condition is not satisfied, the CPU makes a "No" determination at step 310 and the process proceeds to step 395. At step 395, the CPU terminates the present routine tentatively. On the other hand, if the execution condition is satisfied, the CPU makes a "Yes" determination at step 310, and the process proceeds to step 315. At step 315, the CPU sets the value of the execution flag Xexe to "1". The process then proceeds to step 395 and the CPU terminates the present routine tentatively.

If the value of the execution flag Xexe is "1" when the process proceeds to step 305, the CPU makes a "No" determination at step 305 and the process proceeds to step 320. At step 320, the CPU determines whether or not the end condition is satisfied. As an example, the CPU determines that the end condition is satisfied when a predetermined end time Tend has elapsed since the execution condition is satisfied.

If the end condition is not satisfied, the CPU makes a "No" determination at step 320 and the process proceeds to step 325. At step 325, the CPU determines whether or not the value of an override flag Xovr is "0".

The value of the override flag Xovr is set to "1" when the override condition is satisfied, and is set to "0" when the predetermined time has elapsed since the override condition is satisfied or when the end condition is satisfied. The value of the override flag Xovr is also set to "0" in the initial routine.

If the value of the override flag Xovr is "0", the CPU makes a "Yes" determination at step 325 and the CPU executes steps 330 and 335.

Step 330: The CPU executes a threshold angle setting subroutine (referring to FIG. 4) to set the threshold angle θth. Details of the threshold angle setting subroutine are described below.

Step 335: The CPU determines whether or not the magnitude of the steering angle θ (|θ|) is equal to or greater than the threshold angle θth (in other words, whether or not the override condition is satisfied).

If the magnitude of the steering angle θ (|θ|) is smaller than the threshold angle θth (in other words, the override condition is not satisfied), the CPU makes a "No" determination at step 335 and the process proceeds to step 340.

At step 340, the CPU sets a target steering angle θtgt to the deviation suppression steering angle θdev and controls the steering motor 40 so that the steering angle θ matches the target steering angle θtgt. The process then proceeds to step 395, and the CPU terminates the present routine tentatively.

If the magnitude of the steering angle θ (|θ|) is equal to or greater than the threshold angle θth when the process proceeds to step 335 (in other words, the override condition is satisfied), the CPU makes a "Yes" determination at step 335 and executes steps 345 and 350.

Step 345: The CPU sets the target steering angle θtgt to "a manual steering angle θman corresponding to the steering angle θ" and controls the steering motor 40 so that the steering angle θ matches the target steering angle θtgt. Therefore, the steered angle of the steered wheels of the host vehicle SV is controlled according to the manual steering angle θman by the driver's steering operation, not the deviation suppression steering angle θdev. Accordingly, when the override condition is satisfied, the deviation control is stopped (suspended). Thereafter, the process proceeds to step 395, and the CPU terminates the present routine tentatively.

If the value of the override flag Xovr is "1" when the process proceeds to step 325, the CPU makes "No" determination at step 325 and the process proceeds to step 355. At step 355, the CPU determines whether or not a predetermined time has elapsed from a satisfaction time point at which the override condition was satisfied. As an example, this predetermined time is set to a value shorter than the end time Tend.

If the predetermined time has not elapsed from the satisfaction time point, the CPU makes a "No" determination at step 355 and the process proceeds to step 350. On the other hand, if the predetermined time has elapsed from the satisfaction time point, the CPU makes a "Yes" determination at step 355, and the process proceeds to step 360. At step 360, the CPU sets the value of the override flag Xovr to "0". The process then proceeds to step 340.

If the end condition is satisfied when the process proceeds to step 320, the CPU makes a "Yes" determination at step 320 and the process proceeds to step 365. At step 365, the CPU sets the value of the execution flag Xexe to "0" and sets the value of the override flag Xovr to "0". Thereafter, the process proceeds to step 395 and the CPU terminates the present routine tentatively.

<Threshold Angle Setting Subroutine>

Figure 4:
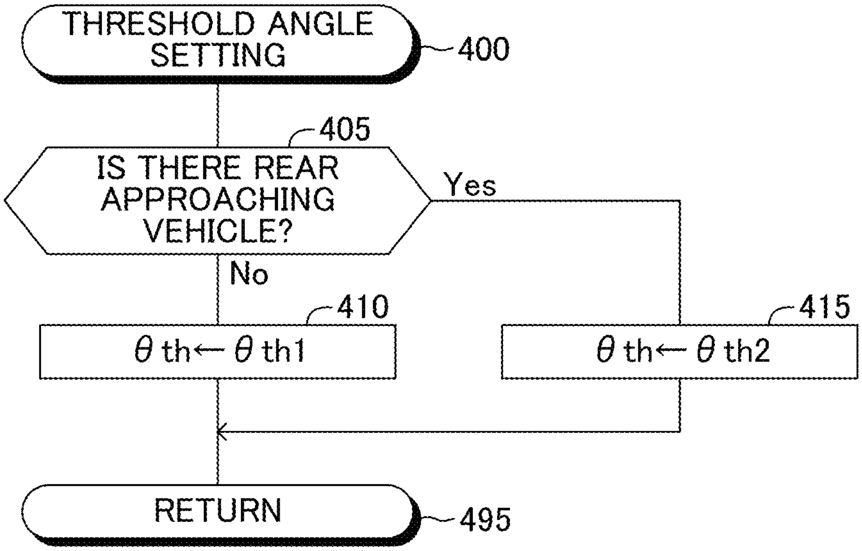
FIG. 4 is a flowchart illustrating a threshold angle setting subroutine executed by the CPU of the ECU shown in FIG. 1.

When the process proceeds to step 330 in FIG. 3, the CPU starts a process at step 400 in FIG. 4, and the process proceeds to step 405. At step 405, the CPU determines whether or not there is the rear approaching vehicle RV based on the rear image data.

If there is no rear approaching vehicle RV, the CPU makes a "No" determination at step 405 and the process proceeds to step 410. At step 410, the CPU sets the threshold angle θth to the first threshold angle θth1. Thereafter, the process proceeds to step 495 and the CPU terminates the present routine tentatively.

If there is the rear approaching vehicle RV, the CPU makes a "Yes" determination at step 405 and the process proceeds to step 415. At step 415, the CPU sets the threshold angle θth to "the second threshold angle θth2 greater than the first threshold angle θth1. Thereafter, the process proceeds to step 495, and the CPU terminates the present routine tentatively.

As explained above, according to the present embodiment, the override condition (in detail, the override condition on each of a right side and a left side) is more difficult to be satisfied when there is the rear approaching vehicle RV than when there is no rear approaching vehicle RV. This can reduce the possibility that the host vehicle SV collides with the rear approaching vehicle RV.

First Modification Example

The ECU 20 according to the present modification example acquires the magnitude of the steering angle θ which is the negative value as a right steering angle θR and the magnitude of the steering angle θ which is the positive value as a left steering angle θL. The ECU 20 determines that the override condition is satisfied when the right steering angle θR is equal to or greater than a right threshold angle θRth (when a right side override condition is satisfied)

or the left steering angle θL is equal to or greater than a left threshold angle θLth (when a left side override condition is satisfied).

If there is no rear approaching vehicle RV, the ECU 20 sets the right threshold angle θRth and the left threshold angle θLth to a first right threshold angle θRth1 and a first left threshold angle θLth1, respectively.

When there is the rear approaching vehicle RV and the rear approaching vehicle RV indicates an intention to change lanes to the right side, the ECU 20 sets the right threshold angle θRth to "a second right threshold angle θRth2 greater than the first right threshold angle θRth1" and the left threshold angle θLth to the first left threshold angle θLth1. When the rear approaching vehicle RV indicates the intention to change lanes to the left side, the ECU 20 sets the left threshold angle θLth to "a second left threshold angle θLth2 greater than the first left threshold angle θLth1" and sets the right threshold angle θRth to the first right threshold angle θRth1. That is, the ECU 20 makes it more difficult for the override condition of the lane change destination of the rear approaching vehicle RV to be satisfied when the rear approaching vehicle RV indicates the intention to change lanes than when there is no rearward approaching vehicle RV.

The ECU 20 makes it difficult for only "the override condition on the side where there is a high possibility that the host vehicle SV will collide with the rear approaching vehicle RV" to be satisfied. This can reduce the possibility that the host vehicle SV collides with the rear approaching vehicle RV. Furthermore, when the driver steers the vehicle to the side where there is a low possibility that the vehicle SV will collide with the rear approaching vehicle RV, the override condition will be satisfied as usual, thus reducing the possibility of giving the driver a sense of discomfort.

If there is an overtaking lane adjacent to the traveling area TA when the rear approaching vehicle RV does not indicate the intention to change lanes, the ECU 20 increases the threshold angle θth on a side of the overtaking lane of the right threshold angle θRth and the left threshold angle θLth than if there is no rear approaching vehicle RV. In a country where drivers keep to the left side of a road, the ECU 20 sets the right threshold angle θRth to the second right threshold angle θRth2 because the overtaking lane exists on the right side of the travel area TA. In a country where the drivers keep to the right side of the road, the ECU 20 sets the left threshold angle θLth to the second left threshold angle θLth2 because the overtaking lane exists on the left side of the travel area TA. In the following description, the country where the drivers keep to the left side of the road is assumed.

The rear approaching vehicle RV may suddenly change lanes without indicating the intention to change lanes. In such a case, there is a high possibility that the rear approaching vehicle RV changes lanes to the overtaking lane. If the rear approaching vehicle RV does not indicate the intention to change lanes, the ECU 20 makes it difficult for only the override condition on the side of the overtaking lane to be satisfied. This can reduce the possibility of giving the driver the sense of discomfort and the possibility that the host vehicle SV collides with the rear approaching vehicle RV.

Figure 5:
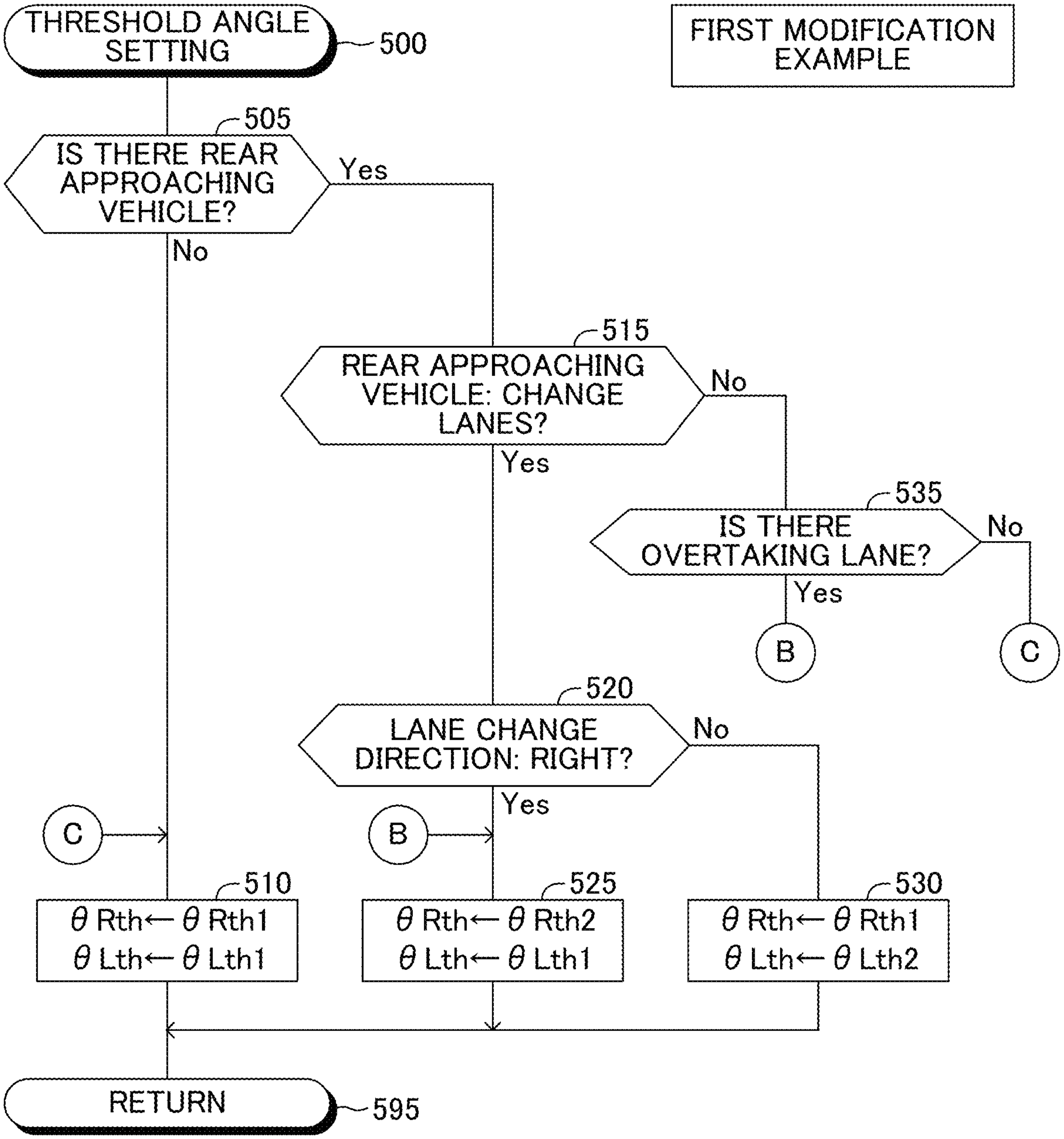
FIG. 5 is a flowchart illustrating the deviation control routine executed by the CPU of the ECU of the driving support apparatus according to a first modification example of the embodiment of the present disclosure.

The CPU of the ECU 20 according to the present modification example executes a threshold angle setting subroutine shown in FIG. 5 instead of the threshold angle setting subroutine shown in FIG. 4.

When the process proceeds to step 330 in FIG. 3, the CPU starts a process from step 500 in FIG. 5. At step 505, the CPU determines whether or not there is the rear approaching vehicle RV.

If there is no rear approaching vehicle RV, the CPU makes a "No" determination at step 505 and the process proceeds to step 510. At step 510, the CPU sets the right threshold angle θRth to the first right threshold angle θRth1 and sets the left threshold angle θLth to the first left threshold angle θLth1. Thereafter, the process proceeds to step 595 and the CPU terminates this routine tentatively. The process then proceeds to step 335 shown in FIG. 3, where the CPU determines whether or not one of the right override condition that the right steering angle θR is equal to or greater than the right threshold angle θRth and the left override condition that the left steering angle θL is equal to or greater than the left threshold angle θLth is satisfied.

If one of the right override condition and left override condition is satisfied, the CPU makes a "Yes" determination at step 335. If neither the right override condition nor the left override condition is satisfied, the CPU makes a "No" determination at step 335.

If there is the rear approaching vehicle RV when the process proceeds to step 505, the CPU makes a "Yes" determination at step 505 and the process proceeds to step 515. At step 515, the CPU determines whether or not the rear approaching vehicle RV indicates the intention to change lanes. As an example, if the CPU determines that a blinker of the rear approaching vehicle RV is activated based on the rear image data, the CPU determines that the rear approaching vehicle RV indicates the intention to change lanes. As another example, the CPU determines that the rear approaching vehicle RV indicates the intention to change lanes when a lateral speed of the rear approaching vehicle RV acquired based on the plurality of rear image data is equal to or higher than a threshold speed. A lateral acceleration may be used instead of the lateral speed. Further, as another example, if the inter-vehicle communication I/F 38 receives a "lane change signal indicating that the lane change is about to be performed" from the rear approaching vehicle RV, the CPU determines that the rear approaching vehicle RV indicates the intention to change lanes If the rear approaching vehicle RV indicates the intention to change lanes, the CPU makes a "Yes" determination at step 515 and the process proceeds to step 520. At step 520, the CPU determines whether or not a lane change direction of the rear approaching vehicle RV is to the right.

If the lane change direction is to the right, the CPU makes a "Yes" determination at step 520 and the process proceeds to step 525. At step 525, the CPU sets the right threshold angle θRth to the second right threshold angle θRth2 and sets the left threshold angle θLth to the first left threshold angle θLth1. Thereafter, the process proceeds to step 595 and the CPU terminates the present routine tentatively so as to execute step 335 in FIG. 3.

If the lane change direction is to the left, the CPU makes a "No" determination at step 520 and the process proceeds to step 530. At step 530, the CPU sets the right threshold angle θRth to the first right threshold angle θRth1 and sets the left threshold angle θLth to the second left threshold angle θLth2. Thereafter, the process proceeds to step 595 and the CPU terminates the present routine tentatively so as to execute step 335 in FIG. 3.

If there is no rearward approaching vehicle RV when the process proceeds to step 515, the CPU makes a "No" determination at step 515 and the process proceeds to step 535. At step 535, the CPU determines whether or not there is the overtaking lane on the right side of the travel area TA based on the front image data. The overtaking lane is a lane adjacent to the travel area TA and permitted to travel in the same direction as a travel direction of the host vehicle SV.

If there is the overtaking lane, the CPU makes a "Yes" determination at step 535 and the process proceeds to step 525. If there is no overtaking lane, the CPU makes a "No" determination at step 535 and the process proceeds to step 510.

As described above, according to the present modification example, only the override condition on the side where there is a high possibility that the rear approaching vehicle RV will change lanes is made difficult to be satisfied. Therefore, the present modification example can reduce the possibility of giving the driver the sense of discomfort and the possibility that the host vehicle SV collides with the rear approaching vehicle RV.

The override condition on a side opposite to which the rear approaching vehicle RV changes lanes (or on a side opposite to the overtaking lane) may be made easier to be satisfied. When the rear approaching vehicle RV overtakes the host vehicle SV, the driver of the host vehicle SV may intentionally perform a steering operation "on the side opposite to which the rear approaching vehicle RV overtakes the host vehicle SV" in order to avoid the rear approaching vehicle RV that is trying to overtake the host vehicle SV. If the deviation control is executed during such a steering operation, the deviation control is stopped immediately. Therefore, the possibility that the deviation control may give the driver the sense of discomfort can be reduced.

Furthermore, when the CPU makes a "No" determination at step 505, the CPU may determine whether or not there is the overtaking lane adjacent to the travel area TA, and the process proceeds to step 515 only if there is the overtaking lane.

Second Modification Example

The ECU 20 may execute a deviation warning instead of the vehicle control as the deviation control. The ECU 20 may execute both the vehicle control and the deviation warning as the deviation control. In other words, the ECU 20 executes at least one of the vehicle control and the deviation warning as the deviation control.

In the deviation warning, the ECU 20 displays, on the display device 44, a deviation warning screen to inform the driver that the vehicle SV may deviate from the travel area TA (or has deviated from the travel area TA). The ECU 20 may cause the speaker 46 to emit a deviation warning sound to inform the driver that the vehicle SV may deviate from the travel area TA (or has deviated from the travel area TA).

Third Modification Example

The ECU 20 makes the override condition difficult to be satisfied by increasing the threshold angle $\theta th$ (the right threshold angle $\theta Rth$ and the left threshold angle $\theta Lth$), but the present disclosure is not limited thereto. For example, the ECU 20 may make the steering angle $\theta$ to be compared with the threshold angle $\theta th$ smaller than the actual steering angle $\theta$ so as to make the override condition difficult to be satisfied. Specifically, the ECU 20 uses a value obtained by multiplying the actual steering angle $\theta$ by a weight factor $\alpha$ ($0 \leq \alpha < 1$) as the steering angle $\theta$ to be compared with the threshold angle $\theta th$.

Fourth Modification Example

The ECU 20 determines that the override condition is satisfied when the steering angle $\theta$ is equal to or greater than the threshold angle $\theta th$, but the present disclosure is not limited thereto. Instead of the steering angle $\theta$, at least one of the following may be used: the steering torque Tr, a steering angular velocity, the steered angle of the steered wheels, a steered angular velocity, a lateral speed of the host vehicle SV, and a lateral acceleration Gy of the host vehicle SV. These values are related to the steering operation performed by the driver and are also referred to as steering index values.

Fifth Modification Example

The ECU 20 determines that the end condition is satisfied when the predetermined end time Tend has elapsed after the execution condition is satisfied, but the present disclosure is not limited thereto. For example, the ECU 20 may determine that the end condition is satisfied when the vehicle SV is located inside an "end reference line set inside the reference line RL". As another example, the ECU 20 may determine that the end condition is satisfied when the predicted path PR no longer intersects the reference line RL or the end reference line.

Sixth Modification Example

The ECU 20 may terminate the deviation control by setting the value of the execution flag Xexe to "0" when the override condition is satisfied.

Seventh Modification Example

The ECU 20 may set the reference line RL outside the boundary BL. The present apparatus 10 may be equipped with a sensor (such as a Lidar, a millimeter wave radar or a sonar) capable of detecting the object instead of the rear camera 24.

The present apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV). Furthermore, the apparatus 10 is applicable to a self-driving vehicle. Furthermore, the present disclosure can be regarded as a non-transitory storage medium in which a program for realizing the functions of the apparatus 10 is stored and which is readable by a computer.

What is claimed is:

1. A driving support apparatus configured to execute, as a deviation control, at least one of (i) a deviation warning to a driver of a host vehicle that the host vehicle deviates from a host lane in which the host vehicle is traveling and (ii) a vehicle control for controlling a travel state of the host vehicle, when there is a possibility that the host vehicle may deviate from the host lane or when the host vehicle deviates from the host lane, wherein, the driving support apparatus is configured to:

suspend or terminate the deviation control when an override condition is satisfied while the deviation control is being executed, the override condition being a condition that is satisfied when a steering index value related to a steering operation performed by the driver is equal or greater than a threshold; and make the override condition more difficult to be satisfied when there is a rear approaching vehicle in the host lane than when there is no rear approaching vehicle in the host lane, the rear approaching vehicle being a vehicle approaching the host vehicle from a rear of the host vehicle.

2. The driving support apparatus according to claim 1, wherein the override condition is satisfied when one of a right override condition and a left override condition is satisfied, wherein, the driving support apparatus is configured to:

determine that the right override condition is satisfied when a right steering index value related to the steering operation to a right side performed by the driver is equal or greater than the threshold;

determine that the left override condition is satisfied when a left steering index value related to the steering operation to a left side performed by the driver is equal or greater than the threshold;

when there is the rear approaching vehicle and the rear approaching vehicle indicates an intention to change lanes, make the override condition on a side of a lane change destination of the rear approaching vehicle of the right override condition and the left override condition more difficult to be satisfied than when there is no rear approaching vehicle.

3. The driving support apparatus according to claim 2, wherein, the driving support apparatus is configured to, if the vehicle is travelling in the host lane adjacent to an overtaking lane when there is the rear approaching vehicle and the rear approaching vehicle does not indicate the intention to change lanes, make the override condition on a side of the overtaking lane of the right side override condition and the left side override condition more difficult to be satisfied than if there is no rear-approaching vehicle.

4. A driving support method executed by a computer installed on a host vehicle to execute, as a deviation control, at least one of: (i) a deviation warning to a driver of the host vehicle that the host vehicle deviates from a host lane in which the host vehicle is traveling and (ii) a vehicle control for controlling a travel state of the host vehicle, when there is a possibility that the host vehicle may deviate from the host lane or when the host vehicle deviates from the host lane, comprising:

a first step of suspending or terminating the deviation control when an override condition is satisfied while the deviation control is being executed, the override condition being a condition that is satisfied when a steering index value related to a steering operation performed by the driver is equal or greater than a threshold; and a second step of making the override condition more difficult to be satisfied when there is a rear approaching vehicle in the host lane than when there is no rear approaching vehicle in the host lane, the rear approaching vehicle being a vehicle approaching the host vehicle from a rear of the host vehicle.

5. A non-transitory computer-readable storage medium storing a program for causing a computer to execute, as a deviation control, at least one of (i) a deviation warning to a driver of the host vehicle that the host vehicle deviates from a host lane in which the host vehicle is traveling and (ii) a vehicle control for controlling a travel state of the host vehicle, when there is a possibility that the host vehicle may deviate from the host lane or when the host vehicle deviates from the host lane, the program causing the computer to implement processes of:

suspending or terminating the deviation control when an override condition is satisfied while the deviation control is being executed, the override condition being a condition that is satisfied when a steering index value related to a steering operation performed by the driver is equal or greater than a threshold; and making the override condition more difficult to be satisfied when there is a rear approaching vehicle in the host lane than when there is no rear approaching vehicle in the host lane, the rear approaching vehicle being a vehicle approaching the host vehicle from a rear of the host vehicle.

6. The driving support apparatus according to claim 1, further comprising a sensor configured to detect a rear area of the host vehicle in the host lane, wherein the driving support apparatus is configured to determine, based on a detection result of the sensor, whether the rear approaching vehicle is present, and when the rear approaching vehicle is present, make the override condition more difficult to be satisfied than when there is no rear approaching vehicle present.

7. The driving support method according to claim 4, further comprising:

detecting a rear area of the host vehicle in the host lane using a sensor, determining, based on a detection result of the sensor, whether the rear approaching vehicle is present, and when there is the rear approaching vehicle, make the override condition more difficult to be satisfied than when there is no rear approaching vehicle present.

8. The non-transitory computer-readable storage medium according to claim 5, wherein the program further causes the computer to implement processes of:

detecting a rear area of the host vehicle in the host lane using a sensor, determining, based on a detection result of the sensor, whether the rear approaching vehicle is present, and when there is the rear approaching vehicle, make the override condition more difficult to be satisfied than when there is no rear approaching vehicle present.

9. The driving support method according to claim 4, wherein the override condition is satisfied when one of a right override condition and a left override condition is satisfied, wherein, the right override condition is satisfied when a right steering index value related to the steering operation to a right side performed by the driver is equal or greater than the threshold;

the left override condition is satisfied when a left steering index value related to the steering operation to a left side performed by the driver is equal or greater than the threshold;

when there is the rear approaching vehicle and the rear approaching vehicle indicates an intention to change lanes, make the override condition on a side of a lane change destination of the rear approaching vehicle of the right override condition and the left override condition more difficult to be satisfied than when there is no rear approaching vehicle.

10. The non-transitory computer-readable storage medium according to claim 5, wherein the override condition is satisfied when one of a right override condition and a left override condition is satisfied, wherein, the right override condition is satisfied when a right steering index value related to the steering operation to a right side performed by the driver is equal or greater than the threshold;

the left override condition is satisfied when a left steering index value related to the steering operation to a left side performed by the driver is equal or greater than the threshold;

when there is the rear approaching vehicle and the rear approaching vehicle indicates an intention to change lanes, make the override condition on a side of a lane change destination of the rear approaching vehicle of the right override condition and the left override condition more difficult to be satisfied than when there is no rear approaching vehicle.

11. The driving support apparatus according to claim 1, wherein the driving support apparatus is configured to make the override condition more difficult to be satisfied when there is the rear approaching vehicle and the rear approaching vehicle indicates an intention to change lanes than when there is no rear approaching vehicle.

12. The driving support apparatus according to claim 1, wherein the override condition is satisfied when one of a right override condition and a left override condition is satisfied, wherein the driving support apparatus is configured to:

determine that the right override condition is satisfied when a right steering index value is equal to or greater than a right threshold; and determine that the left override condition is satisfied when a left steering index value is equal to or greater than a left threshold.

13. The driving support apparatus according to claim 12, wherein the driving support apparatus is configured to make one of the right override condition and the left override condition more difficult to be satisfied when there is the rear approaching vehicle than when there is no rear approaching vehicle.

14. The driving support apparatus according to claim 13, wherein the driving support apparatus is configured to, when there is the rear approaching vehicle and the rear approaching vehicle indicates an intention to change lanes, make one of the right override condition and the left override condition more difficult to be satisfied than when there is no rear approaching vehicle.

15. The driving support method according to claim 4, wherein the override condition is made more difficult to be satisfied when there is the rear approaching vehicle and the rear approaching vehicle indicates an intention to change lanes than when there is no rear approaching vehicle.

16. The driving support method according to claim 4, wherein the override condition is satisfied when one of a right override condition and a left override condition is satisfied, wherein the right override condition is satisfied when a right steering index value is equal to or greater than a right threshold, and wherein the left override condition is satisfied when a left steering index value is equal to or greater than a left threshold.

17. The driving support method according to claim 16, wherein one of the right override condition and the left override condition is made more difficult to be satisfied when there is the rear approaching vehicle than when there is no rear approaching vehicle.

18. The driving support method according to claim 17, wherein when there is the rear approaching vehicle and the rear approaching vehicle indicates an intention to change lanes, one of the right override condition and the left override condition is made more difficult to be satisfied than when there is no rear approaching vehicle.

19. The non-transitory computer-readable storage medium according to claim 5, wherein the override condition is made more difficult to be satisfied when there is the rear approaching vehicle and the rear approaching vehicle indicates an intention to change lanes than when there is no rear approaching vehicle.

20. The non-transitory computer-readable storage medium according to claim 5, wherein the override condition is satisfied when one of a right override condition and a left override condition is satisfied, wherein the right override condition is satisfied when a right steering index value is equal to or greater than a right threshold, and wherein the left override condition is satisfied when a left steering index value is equal to or greater than a left threshold.

* * * * *